(12) United States Patent
Schröder

(10) Patent No.: US 7,547,420 B2
(45) Date of Patent: Jun. 16, 2009

(54) AIR PURIFICATION DEVICE

(76) Inventor: Werner Schröder, Beckedorfer Strasse 1, 31542 Bad Nenndorf (DE)

( * ) Notice: Subject to any disclaimer, the term of this patent is extended or adjusted under 35 U.S.C. 154(b) by 892 days.

(21) Appl. No.: 11/050,456

(22) Filed: Feb. 4, 2005

(65) Prior Publication Data

US 2005/0207950 A1    Sep. 22, 2005

Related U.S. Application Data

(63) Continuation of application No. PCT/EP03/08789, filed on Aug. 7, 2003.

(30) Foreign Application Priority Data

Aug. 7, 2002    (DE) ................... 102 36 196

(51) Int. Cl.
  *B01J 19/08* (2006.01)
(52) U.S. Cl. .................. 422/186.04; 422/121; 96/95
(58) Field of Classification Search ........... 422/186.04, 422/121; 96/95
  See application file for complete search history.

(56) References Cited

FOREIGN PATENT DOCUMENTS

| DE | 4334956 | 4/1995 |
|---|---|---|
| DE | 19651402 | 6/1998 |
| DE | 19919623 | 11/2000 |
| DE | 10007523 | 9/2001 |
| DE | 10111445 | 9/2002 |
| DE | 10134707 | 2/2003 |
| WO | WO 01/62306 | 8/2001 |

OTHER PUBLICATIONS

International Search Report for PCT/EP03/08789, Nov. 11, 2003.

*Primary Examiner*—Kishor Mayekar
(74) *Attorney, Agent, or Firm*—Shlesinger, Arkwright & Garvey LLP

(57) ABSTRACT

An air purification device for reducing pollutants in the air comprises an ionizer, which is exposed to the air flow and impinged upon by an ionization power from a drive stage for ionizing the air that is supplied by the air flow, and a gas sensor for measuring pollutant concentrations. To provide an air purification device, which purifies the air according to requirements even if the pollutant concentrations change rapidly and/or have extreme values, the driver stage, ionizer and gas sensor cooperate with a controller in a closed loop control circuit, in such a way that the output signal of the gas sensor essentially corresponds to a predetermined target value.

20 Claims, 15 Drawing Sheets

AIR PURIFICATION DEVICE

RELATED APPLICATION

This is a continuation of International Application No. PCT/EP2003/008789, filed Aug. 7, 2003, which claims the priority benefit of German Patent Application No. 102 36 196.7, filed Aug. 7, 2002, incorporated herein by reference.

FIELD OF THE INVENTION

The invention relates to an air purification device for reducing pollutants in the air, comprising an ionizer, which is exposed to an air flow and may be acted on, from a driver stage, by ionization power, wherein the air supplied by the air flow may be ionized as a function of the ionization power, and comprising a gas sensor for measuring pollutant concentrations.

BACKGROUND OF THE INVENTION

It is in principle known to treat room air or breathing air with what are known as ionizers, in order to reduce pollutants. Pollutants and odorous substances usually form complex and large molecules, which are broken down by the ionizer into small molecular fragments. At the same time, radicals, in particular oxygen radicals, form as a result of the ionization, and these radicals can then oxidize with the broken-down fragments. The ionizer operates on the basis of a controlled gas discharge that takes places between two electrodes and a dielectric located therebetween. The gas discharge is a barrier discharge, the dielectric acting as a dielectric barrier. Individual discharges that are limited with respect to time and are preferably distributed homogeneously over the entire electrode surface are thus attained. It is characteristic of these barrier discharges that the transition into a thermal arc discharge is prevented by the dielectric barrier. The discharge is interrupted before the high-energy electrons (1-10 eV) that arise during the striking process release their energy to the surrounding gas as a result of thermalization.

In the household sector, in particular, various applications for an air purification device of this type have been proposed in the past. For example, it is known from DE 198 10 497 A1 to provide an air purification device of this type in a toilet, in order to eliminate odors. For this purpose, suitable suction devices comprising air ducts on the upper flushing rim of the WC-bowl or in a hollow channel in the toilet seat lead the contaminated air to the ionizer, in order to reduce the odor contamination.

One problem in the operation of the ionizer is that of activating the ionizer at an ionization power suitable to requirements. If the ionizer is acted on by too little ionization power, the ionization is unsatisfactorily low, whereas if ionization is too high, too many ions and radicals, which leave the operator with the impression of the odor of a pungent corrosive or cleansing agent, are sometimes released. In this operating state, in addition to the formation of ions, there is also the production of ozone, the excessive production of which is likewise undesirable.

In order to solve this problem, WO 98/26482 describes an air purification device comprising an ionizer, the supply voltage of which is controlled via a gas sensor. The gas sensor is a metal oxide semiconductor sensor, the resistance of which decreases as the concentration of specific gases (generally oxidizable gases or vapors, such as hydrogen sulphide, hydrogen, ammonia, ethanol or carbon monoxide, for example) increases. The variation in resistance is thus a measure of the contamination of the air with specific pollutants. According to WO 98/26482, as the pollutant concentration rises, the ionization power by which the ionizer is acted on is increased in a sensor-controlled manner up to a maximum value. In other words, at a low pollutant concentration measured by the gas sensor, the ionizer is acted on by a correspondingly low ionization power, whereas at a high pollutant concentration measured by the gas sensor, the ionizer is also activated at a correspondingly high ionization power. In order to supplement this sensor control, WO 98/26482 also describes the use of an additional ionization sensor and/or ozone sensor. Since it is a prerequisite that the air quality sensor in the sensor control measures the pollutant concentration of the supplied air and is thus arranged, in terms of the flow technology, upstream of the ionizer, the purpose of the additional ionization sensor and/or ozone sensor is to identify an ozone concentration, which is still undesirable, in the purified air, in order then optionally to correct the ionization power as appropriate.

A sensor control corresponding to WO 98/26482 is also described in DE 43 34 956 A1. DE 43 34 956 A1 proposes a tin oxide gas sensor that detects the oxidizable room air components. If this gas sensor identifies a relatively high degree of room contamination, then the ionizer is also activated at a relatively high ionization power. The use of a moisture sensor and a flow sensor is also proposed, in order to increase the ionization power even if a relatively large volume of air or a relatively high air moisture content is measured.

One drawback of the control methods known from WO 98/26482 and DE 43 34 956 A1 is the fact that the gas sensors used have a limited measuring range and also a comparatively slow reaction time. As a result of the limited measuring range, sensor control of the ionization power is not possible in the peripheral regions of the measuring range. If, for example, the pollutant concentration is below the lowest measurement value of the gas sensor, the ionizer is either switched off or the ionization power continues to be operated at a predetermined minimum value. In the event of rapidly varying pollutant concentrations, the slow reaction time of the sensor also means that the ionizer is only activated according to requirements after a certain delay. In the elimination of odors in a toilet, for example, this delay is disadvantageous, since precisely in the event of a precipitous increase in odorous substances, immediate elimination of the odorous substances by means of the ionizer is desirable.

OBJECTS AND SUMMARY OF THE INVENTION

The object of the invention is therefore to provide an air purification device that allows the air to be purified according to requirements even if pollutant concentrations vary rapidly and/or take on extreme values.

This object is achieved by an air purification device and a method for reducing pollutants according to the invention.

A fundamental feature of the invention consists in the fact that the driver stage, the ionizer and the gas sensor cooperate with a controller in a closed loop control circuit such that the output signal of the gas sensor substantially corresponds to a predetermined desired value. In other words, whereas according to the prior art, a sensor control is proposed wherein the sensor characteristic curve extends as a function of the measured pollutant concentration, the invention describes a fundamentally different path. In accordance with the invention, the gas sensor is only operated at a specific operating point, which is determined by the desired value of the control circuit. The gas sensor therefore always supplies as an output signal a value that substantially corresponds to the desired value, whereas the controller is responsible for adjusting in the ionizer precisely that ionization power that maintains the output of the gas sensor at said desired value.

Nevertheless, in order to achieve this aim, there has to be a certain feedback between the gas sensor and the ionizer. However, the need for this feedback and the relation between the feedback and the arrangement of the gas sensor with respect to the air flow and with respect to the ionizer were not previously recognized in the prior art either. The arrangements of the gas sensor described in the prior art merely relate to arrangements that, in terms of flow technology, are located upstream of the ionizer, so that the control circuit effect in accordance with the invention cannot occur.

In contrast to this, the invention is also based on the recognition that the gas sensor is arranged with respect to the air flow and with respect to the ionizer such that, in an open loop control circuit, a variation in the output signal of the gas sensor owing to a precipitous variation in the pollutant concentration in the air supplied by the air flow may be compensated by a variation in the ionization energy such that the output signal of the gas sensor may be returned to its original value. The feedback between the ionizer and gas sensor must therefore be produced by means of the arrangement of the gas sensor with respect to the air flow and with respect to the ionizer such that the effect of the ionizer and the effect of the pollutant concentration contained in the air may be superimposed on the gas sensor.

There is an open loop control circuit, in the terms of the invention, if an electric feedback between the output signal of the gas sensor and the controller is interrupted.

There is a precipitous variation in the pollutant concentration as a test function for the open loop control circuit, in the terms of the invention, if, at a specific moment, the pollutant concentration in the air supplied to the ionizer by means of the air flow changes from a first constant value by a specific jump height to a second constant value. In a practical experimental arrangement, this means that optionally provided circulation air of the air flow has to be interrupted, so that the pollutant concentration in the air flow supplied to the ionizer remains, as a prerequisite, constant before and after the precipitous variation in the pollutant concentration, and is not additionally influenced by the air flow drawn off by the ionizer.

Typical variations in the pollutant concentration are preferably taken as a basis in the jump amplitude of the precipitous variation in the pollutant concentration. Typical variations in the pollutant concentration in the air flow may be determined for the respective application in that the expected variations in the pollutant concentration are plotted on a histogram, according to their estimated frequency. Any cases that fall within +/−10% of a frequency maximum, for example, may be taken to be typical. If, for example, the air purification device is intended to reduce the odor of cigarette smoke in a room, the expected air contamination resulting from cigarette smoke relative to normal air contamination is taken as the basis for the typical variation in the pollutant concentration. In accordance with the invention, the gas sensor must now be arranged with respect to the air flow and with respect to the ionizer such that the variation in the pollutant concentration in the air flow may be compensated once more by a variation in the ionization energy, such that the output signal of the gas sensor may be returned to its original value, which, in the example, corresponds to the original value of the normal air contamination. Therefore, the greater the expected influence of the variation in the pollutant concentration, the closer the gas sensor also has to be arranged to the ionizer. If, on the other hand, only small variations in the pollutant concentration are expected, then the gas sensor should not be arranged too close to the ionizer, as otherwise the output signal of the gas sensor may easily enter the limitation. In any case, however, the gas sensor must maintain a specific minimum proximity from the ionizer so that there is sufficient feedback between the ionizer and gas sensor to compensate the variations in the pollutant concentration that occur and thus to maintain the output signal, in accordance with the invention, in the region of a predetermined desired value.

A further recognition of the invention consists in the fact that commercially available gas sensors for measuring pollutant concentrations may be used as the measuring element of the control loop. It has been found that even an excessive production of ozone that is harmful for human beings may thus be prevented by means of the ionizer, so that the ionization sensors or ozone sensors that are otherwise used for this purpose are not strictly required.

In the method in accordance with the invention for reducing pollutants in the air, the desired value is adjusted, using the air purification device in accordance with the invention, to a specific pollutant concentration, air containing pollutants is supplied to the ionizer, and air with a reduced pollutant content is drawn off from the ionizer. According to a preferred embodiment, it is provided that, in the circulation air mode, all or part of the drawn-off air is fed back to the ionizer, in order to increase the efficiency of the air purification.

A fundamental advantage of the invention consists in the fact that the efficiency of the air purification device is, in principle, not limited by the measuring range of the gas sensor. Since the gas sensor is, in accordance with the invention, operated at an operating point determined by the desired value, even variations in the pollutant concentration that exceed the measuring range of the gas sensor may be treated by the air purification device. In the case of a conventional sensor control, in contrast, the output signal of the gas sensor would enter the limitation and would thus also limit the activation of the ionizer or the driver stage. The limitations of the air purification device are therefore, in principle, only conditioned by the limitation of the ionization power. The ionization power may, however, be additionally increased by means of suitable measures, such as by connecting further ionizers and/or blowers to increase the flow speed of the air flow, for example. This opens up a broad range of possible applications, from the household sector to the industrial purification of large volumes of air, for the air purification device in accordance with the invention.

A further advantage of the invention consists in the fact that a suitable configuration of the controller facilitates a transient response of the closed loop control circuit, the transient time of which is below the time constant of the gas sensor. This may be achieved, for example, by means of a differential content in the controller, whereby even in the case of small variations in the output signal of the gas sensor, large control variables are produced in the driver stage.

According to a preferred embodiment, it is provided that the driver stage comprises a high-voltage transformer, on the secondary side of which an oscillating high voltage may be generated. The ionization power supplied to the ionizer may be influenced primarily by the peak value of the oscillating high voltage and/or by the pulsing of the oscillating high voltage. Preferably, the driver stage comprises a circuit for pulse width modulation, with which the high-voltage transformer may be activated on the primary side and the peak value and/or the pulse ratio of the secondary-side oscillating high voltage may be adjusted. In a series circuit comprising the high-voltage transformer and resonator, which is supplied on the input side with D.C. voltage, the pulse width-modulated signal may be rectified and supplied to the input of the resonator. The resonator, in turn, supplies an oscillating voltage to the primary side of the high-voltage transformer, so that the peak value on the secondary side of the high-voltage transformer is thus proportional to the pulse width ratio. In addition or alternatively, it may be provided that the high voltage delivered on the secondary side is pulsed. This means that the ionizer is only acted on by a specific number of full waves before the oscillating high voltage is then interrupted once more.

The ionization power thus supplied in the medium is also proportional to the pulse width ratio. The pulse width ratio may be obtained from the same pulse width modulation signal as applied at the input of the resonator, or else a further pulse width modulation signal is generated for this purpose.

According to a further preferred embodiment, it is provided that the secondary-side oscillating high voltage may be adjusted with a peak value in the range from 1 kV to 10 kV and with a frequency in the range from 10 kHz to 50 kHz.

According to a preferred embodiment, the ionizer comprises a glass tube, the inner wall of which is lined with a perforated metal sheet as a first electrode and the outer wall of which is surrounded by a wire mesh as a second electrode, the oscillating high voltage of the driver stage being applied between the first electrode and the second electrode. In order to disinfect or purify the gas flowing around the ionization tube, the high-voltage transformer is activated such that, in the event of a gas discharge, radicals, preferably oxygen radicals, are generated. At a peak value of 1 to 10 kV, the high-voltage transformer is conventionally operated at an A.C. voltage in the range from approx. 10 kHz to 50 kHz, preferably in the range from 15 kHz to 30 kHz. If a gas flows around an ionization tube of this type, a gas discharge, which results in an ionization of the flowing gas, takes place. The gas discharge is a barrier discharge, which takes place by means of the glass tube acting as a dielectric barrier. Individual discharges that are limited with respect to time and are preferably distributed homogeneously over the entire electrode surface are thus attained. It is characteristic of these barrier discharges that the transition into a thermal arc discharge is prevented by the dielectric barrier. The discharge is interrupted before the high-energy electrons (1-10 eV) that arise during the striking process release their energy to the surrounding gas as a result of thermalization. Alternatively, any other configuration of the ionizer is, of course, conceivable, such as a tabular arrangement, for example, or else a combination of a tube arrangement and a tabular arrangement.

According to a preferred embodiment, it is also provided that the gas sensor comprises a metal oxide sensor, the resistance of which varies in the event of reactions with gases. The metal oxide is applied to a substrate, which is maintained at a predetermined temperature using a heating element. Preferably, a gas sensor, which does not exhibit any variation in resistance relative to the varying pollutant concentration in the air, is used. It has been found that particularly reliable control of the pollutant concentration is possible using gas sensors of this type. The metal oxide may, for example, comprise tin oxide.

According to a further preferred embodiment, it is provided that, with respect to the air flowing around the ionizer, the air inlet opening in the gas sensor is at a distance of approx. 0.5 cm to 5.0 cm, preferably approx. 1.0 cm to 2.0 cm, from the surface of the ionizer. It has been found that at these distances, the modulation range of the gas sensor may usually be reconciled with the modulation range of the ionizer and the value range of conventional pollutant concentrations.

According to a further preferred embodiment, it is provided that the desired value may be manually adjusted on the device. The operator is thus able, in a normal pollutant concentration of the air, to determine the operating mode of the device that he finds most comfortable. The arrangement of the gas sensor is particular preferably selected such that the predetermined desired value corresponds to a central range with respect to the total modulation range of the output signal of the gas sensor. Since, in other words, the control circuit ensures, in accordance with the invention, that the pollutant concentration measured by the gas sensor substantially corresponds to the desired value, the gas sensor is thus operated in a range that allows maximum modulation in the transient process of the closed loop control circuit.

According to a further preferred embodiment, it is provided that the air flow is generated by means of convection, which, in the case of small domestic devices, for example, may result from the heating of air supplied to the electrical components of the device.

According to a further preferred embodiment, a ventilator is provided for generating the air flow. It has been recognized that the air flow may also have an influence on the functioning of the control circuit. If, for example, the gas sensor is located, on the flow side, upstream of the ionizer, then there is less coupling between the ionizer and gas sensor, at the same distance of the gas sensor from the surface of the ionizer, in comparison to an arrangement in which the gas sensor is arranged, on the flow side, downstream of the ionizer.

According to a further preferred embodiment, it is therefore provided that an additional controller additionally controls the flow rate of the air flow such that the output signal of the gas sensor substantially corresponds to a predetermined desired value. In particular, it has proven expedient that the additional controller is connected as soon as a limitation occurs in the control circuit comprising the ionizer, driver stage, gas sensor and controller. In this case, the additional controller must act to allow the limitation that has occurred to be suitably compensated.

The functioning of the control circuit is, of course, to a large extent dependent on what type of controller is used. Once the transfer response of the remaining control circuit elements, i.e. the ionizer, the driver stage and the gas sensor, has been determined using suitable identification methods, the controller may, in principle, be configured according to the available control engineering methods. The most obvious examples of convention control circuit elements are a P-controller, a PI-controller or a PID controller. The simplest of these is the P-controller; however, in principle, this requires a control deviation between the predetermined desired value and the pollutant concentration measured by the gas sensor, in order to be able to issue a control variable. Nevertheless, if the amplification factor of the P-controller is selected high enough, the control deviation may be disregarded. However, a high amplification factor of the P-controller is only permissible if there is still sufficient signal/noise distance in the output signal of the gas sensor. If, on the other hand, the signal-noise distance in the output signal of the gas sensor is no longer sufficient for the use of a P-controller, a PI-controller may be used. On account of its integrative response, the PI-controller is able to supply a continuous control variable even if the control deviation disappears. In other words, if a PI-controller is used, the disappearance of the control deviation may, in principle, be attained in the case of a transient control circuit. In order to accelerate the transient response of the control circuit, a differential element is conventionally attached to the PI controller, thus producing a PID-controller. In the event of rapid variations in the pollutant concentration or the desired value, the differential response of the PID-controller may cause limitations to appear in the control circuit elements. In this case, it is advantageous to provide the above-mentioned connection of an additional controller for the flow rate. If the ionization power of the ionizer therefore reaches the upper limit, the additional controller may instead provide an increase in the flow rate of the air flow.

In addition to the conventional P-controller, PI-controller and PID-controller types, other controllers, such as a rule-based fuzzy controller or a state controller, for example, may, of course, also be provided. A rule-based fuzzy controller or a state controller is particularly suitable if, in addition to the measured pollutant concentration, further measurement variables are to be processed by the controller. In principle, it is conceivable to improve the control circuit response using additional sensors, such as a moisture sensor and/or an ionization sensor and/or an ozone sensor.

According to a further preferred embodiment, it is provided that a calibration element calibrates the gas sensor to the desired value if a pollutant concentration corresponding to the desired value is supplied to the gas sensor.

Preferably, the ionization energy supplied to the ionizer is disconnected during the calibration of the gas sensor, in order to prevent disruptive reactions of the ionizer in the calibrating operation. Alternatively, however, the ionizer may also be activated in the calibrating operation with a predetermined continuous ionization power, at which the ionizer may be operated in order to constantly maintain minimum pleasant room air conditions.

The tolerances of a gas sensor, which are conditioned by the manufacturing process, may be compensated by calibrating the gas sensor. When the above-mentioned tin oxide gas sensors were used, it was noted that the tolerances substantially lead to an absolute displacement of the characteristic curve, whereas the relative variation in the sensor signal as a function of the gas concentration remains approximately the same in all of the gas sensors. In this case, the calibration element may comprise a simple adder, which in the calibrating operation adds a corresponding voltage to the output voltage of the gas sensor. In this case, it is also necessary that a pollutant concentration that is specified by the user to be "clean air" is supplied to the gas sensor during the calibrating operation. The aim is to determine, in the calibrating operation by means of the calibration element, the additional voltage that is required to make the control deviation approximately zero.

BRIEF DESCRIPTION OF THE DRAWINGS

The invention will be described below in greater detail using various embodiments, with reference to the accompanying drawings, in which.

DETAILED DESCRIPTION OF THE INVENTION

Figure 1A:
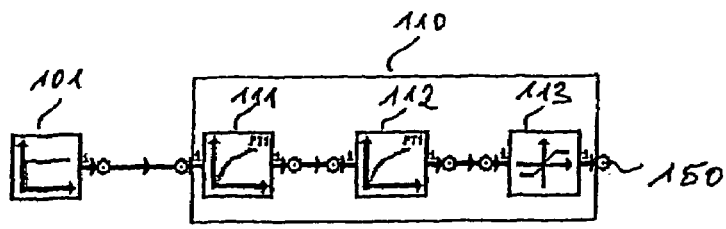
FIG. 1a shows a block diagram of the transfer response of a gas sensor with a jump function as the input.

FIG. 1a shows a block diagram of the transfer response of a gas sensor with a jump function as the input. The series connection of two PT1-elements 111, 112 and a limitation element 113 was accordingly taken as a model for the transfer response of a gas sensor 110. The input function is a precipitous increase in the pollutant concentration 101, wherein the corresponding response function may be traced at the output 150. The following parameters were taken as a basis:

PT1-elements 111, 112: time constant=10.0 sec, transfer value=1.0

Limitation 113: Upper limit=2.0, lower limit=−2.0

It was thus assumed that the output signal of the gas sensor may be activated in a range from −2.0 volts to 2.0 volts.

Figure 1B:
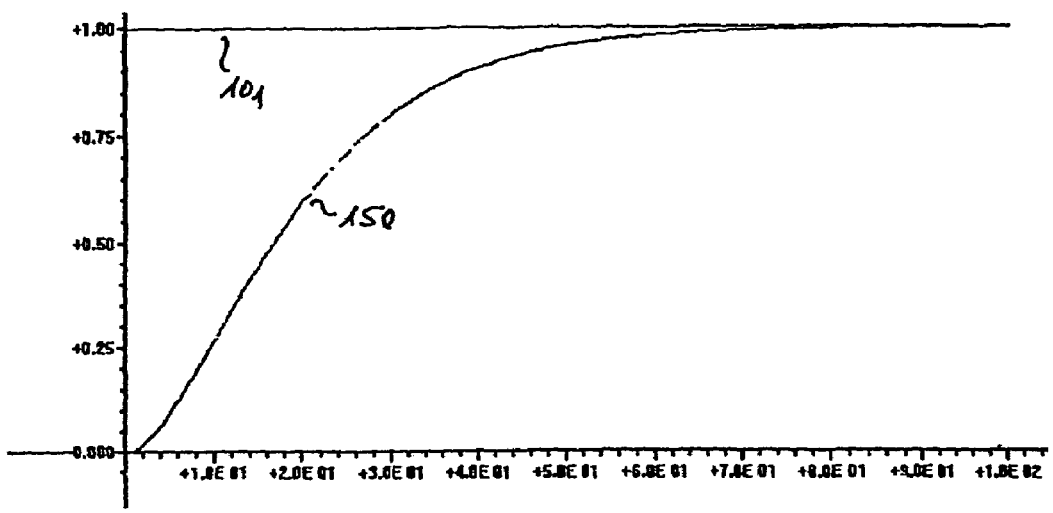
FIG. 1b shows the response function at the output 150 with a jump amplitude of 1.

FIG. 1b shows the response function at the output 150 with a jump amplitude of 1. The gas sensor thus responds, as expected, in a delayed manner to a jump function of the pollutant concentration and, after approx. 60 seconds, exponentially approximates the jump amplitude of 1.

Figure 1C:
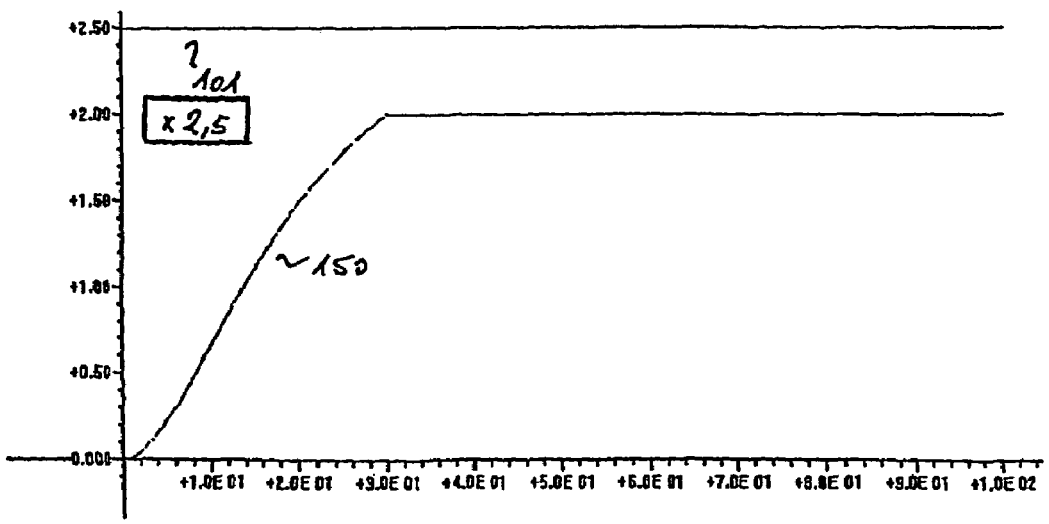
FIG. 1c shows the response function at the output 150 with a jump amplitude of 2.5.

FIG. 1c shows the response function at the output 150 with a jump amplitude of 2.5. Once the value 2.0 has been reached, the limitation 113 enters into effect so that, after approx. 30 seconds, the response function remains constant at the value 2.0 and cannot further approximate the jump amplitude of 2.5.

Figure 2A:
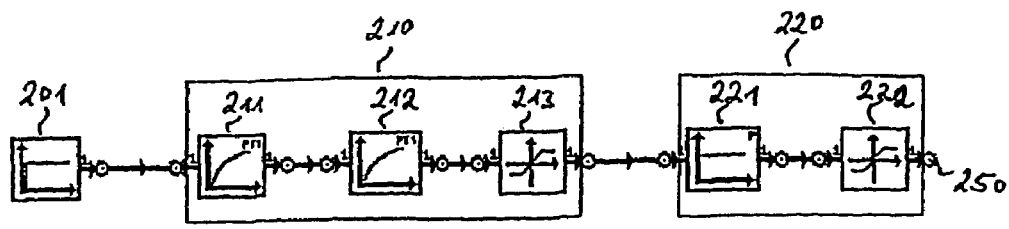
FIG. 2a shows a block diagram of the transfer response of a sensor control with a jump function as the input.

FIG. 2a shows a block diagram of the transfer response of a sensor control with a jump function as the input. The basic structure of a sensor control according to the prior art, such as that according to WO 98/26482 or according to DE 43 34 956 A1, for example, comprises a gas sensor 210 with a subsequent driver stage 220. As in FIG. 1a, the gas sensor 210 comprises two PT1-elements 211, 212 and a limitation 213, the parameters also corresponding to those of FIG. 1a. A P-element 221 with a limitation 222 connected downstream was taken as a basis for the model of the driver stage 220. The following parameters were assumed:

P-element 221: transfer coefficient=250.0
Limiter 222: upper limit=500 V, lower limit=−500.0 V This means that, according to FIG. 2a, the output voltage of the gas sensor 210 is converted by means of the driver stage 220 with the factor 250 into a high voltage; however, for the sake of simplicity, the offsets that occur in practice were not taken into account. Conventional output voltages of a gas sensor connected in a voltage divider are, for example, in the range from 1 V to 5 V and are converted by means of the driver stage into a high voltage of, for example, 1000 V to 2000 V. However, for the model of the control circuit, these offsets are of no further importance and may easily be attached at any time, if required.

In order to examine the transfer response of the sensor control according to FIG. 2a, it was, in turn, assumed that there is at the input a precipitous increase in pollutant concentration 201, which is recorded at the output 250 of the driver stage 220.

Figure 2B:
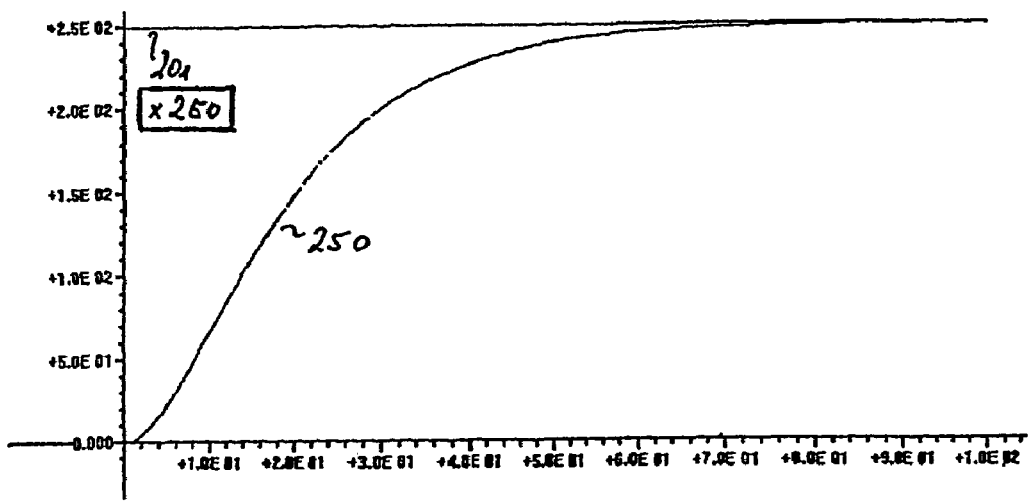
FIG. 2b shows the response function at the output 250 with a jump amplitude of 1.

FIG. 2b shows the response function at the output 250 with a jump amplitude of 1. In order also to be able to illustrate the jump amplitude in FIG. 2b, it was, however, enlarged by the factor 250. As expected, according to FIG. 2b, the same response function appears as in FIG. 1b, but in this case extended by the factor 250, as a result of the driver stage 220 connected downstream.

Figure 2C:
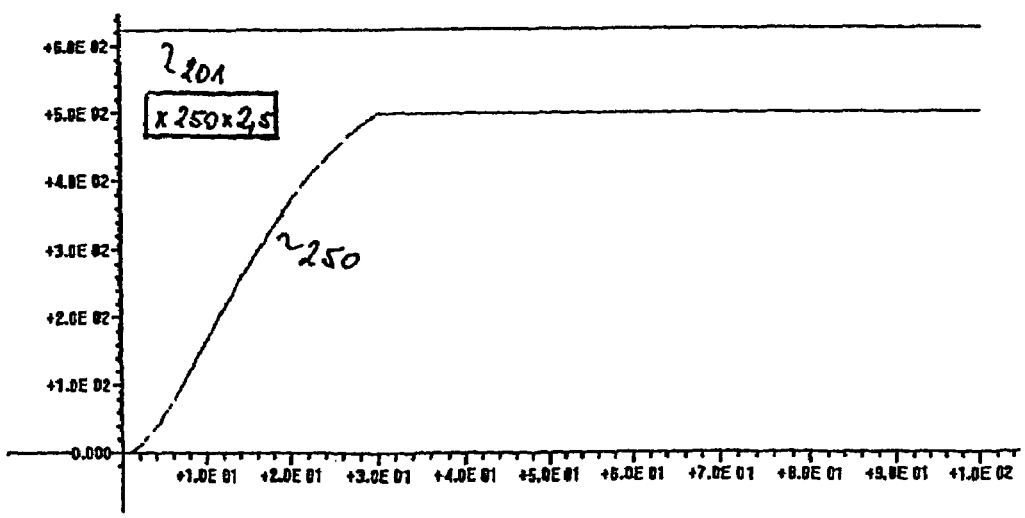
FIG. 2c shows the response function at the output 250 with a jump amplitude of 2.5.

Finally, FIG. 2c shows the response function at the output 250 with a jump amplitude of 2.5, the jump amplitude having once more been enlarged, for reasons of illustration, by the factor 250. As a result of the increased jump amplitude of 2.5, the limitations 213 and 222, respectively, enter into effect, so that, after approx. 30 seconds, the response function according to FIG. 2c remains constant at 500 V.

The illustrated transfer response according to FIGS. 2a, 2b and 2c corresponds substantially to known sensor controls for air purification devices comprising ionizers.

Figure 5A:
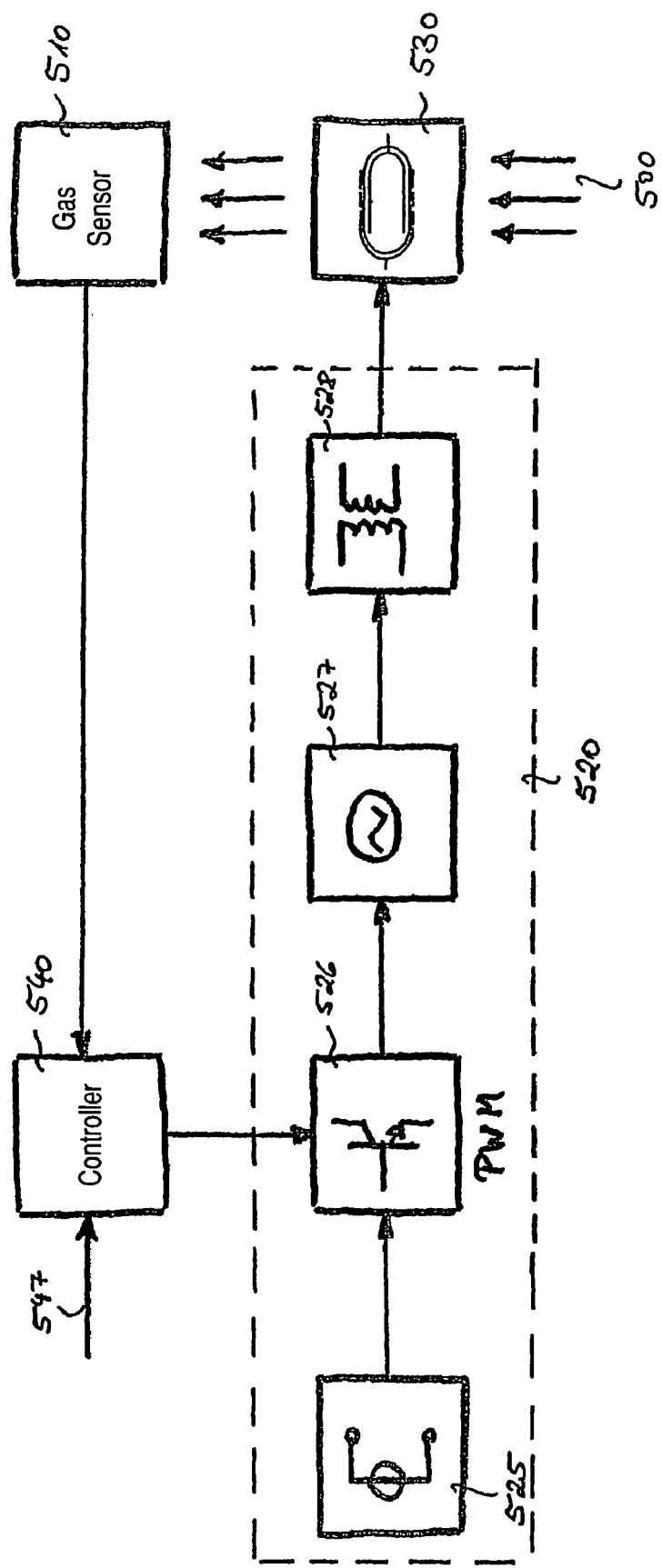
FIG. 5a shows a block diagram of the signal flow of a closed loop control circuit.

In contrast, the invention proposes the construction of a closed loop control circuit, wherein the effects of the pollutant concentration and the air ionization from the ionizer are superimposed and compensated on the pollutant sensor. A block diagram of the signal flow of a control circuit closed in this manner is illustrated in FIG. 5a and will be explained below in greater detail. In order to analyze individual components of the control circuit, a block diagram of the transfer response of an open loop control circuit with a jump function of the pollutant concentration is illustrated in FIG. 3a.

Figure 3A:
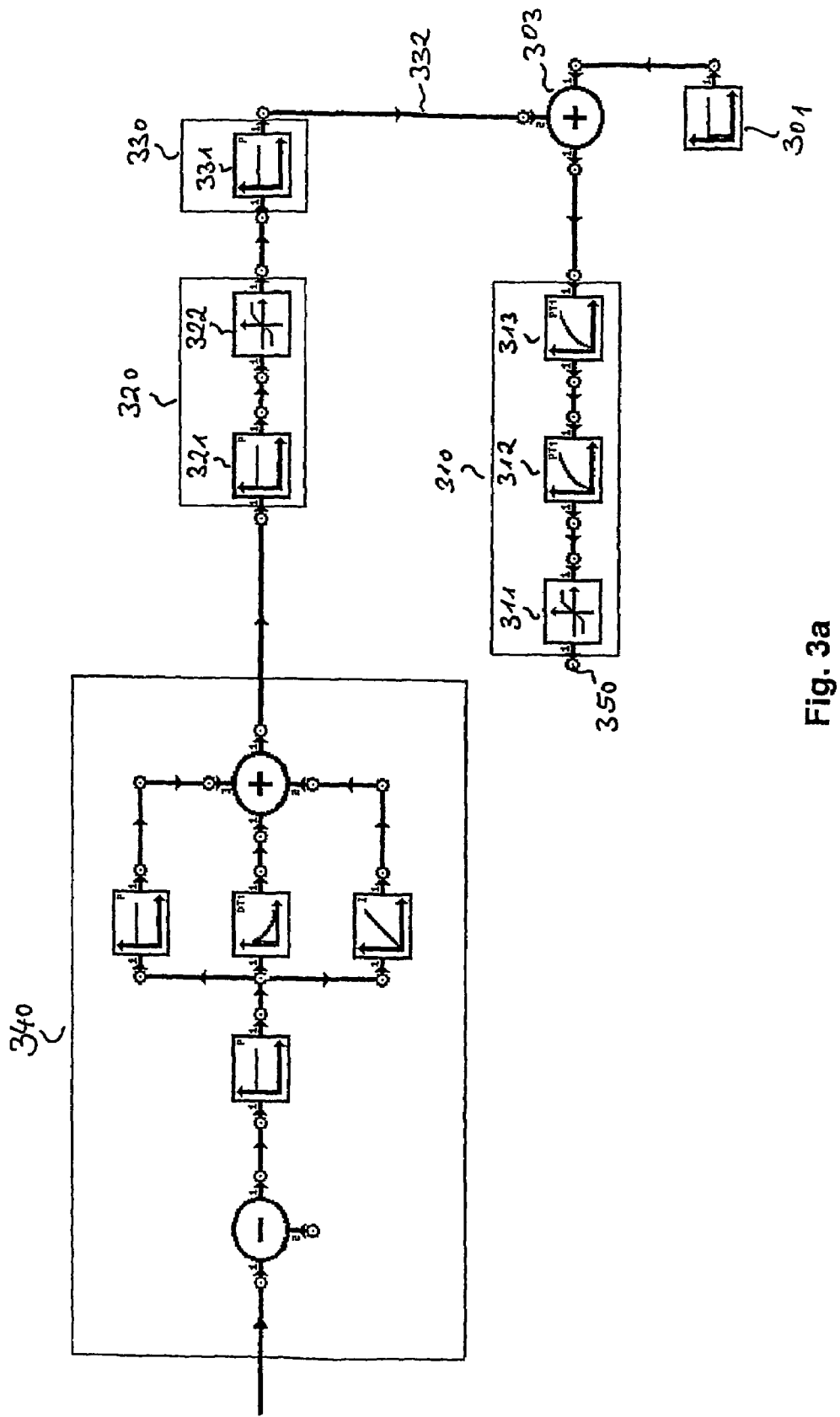
FIG. 3a shows a block diagram of the transfer response of an open loop control circuit with a jump function of the pollutant concentration.

The basic construction of the open loop control circuit according to FIG. 3a comprises a controller 340, a driver stage 320 connected downstream and the subsequent ionizer 330. In accordance with the invention, the effects of the ionizer 330 and the pollutants contained in the air flow are now to be superimposed at the input of the gas sensor 310. The model for this circumstance is formed, in the block diagram according to FIG. 3a, by means of the summation point 303, on which both a jump function of the pollutant concentration 301 and, via the transfer path 332, the ionizer 330 exert an influence. The parameters of the gas sensor 310 are identical to the parameters indicated in FIG. 1a. Since, according to FIG. 3a, the response of the gas sensor is initially to be viewed in isolation, in the case of a jump function of the pollutant concentration, the parameters of the remaining control circuit elements are, for the time being, insignificant, and will therefore only be explained at the appropriate point in the following figures.

Figure 3B:
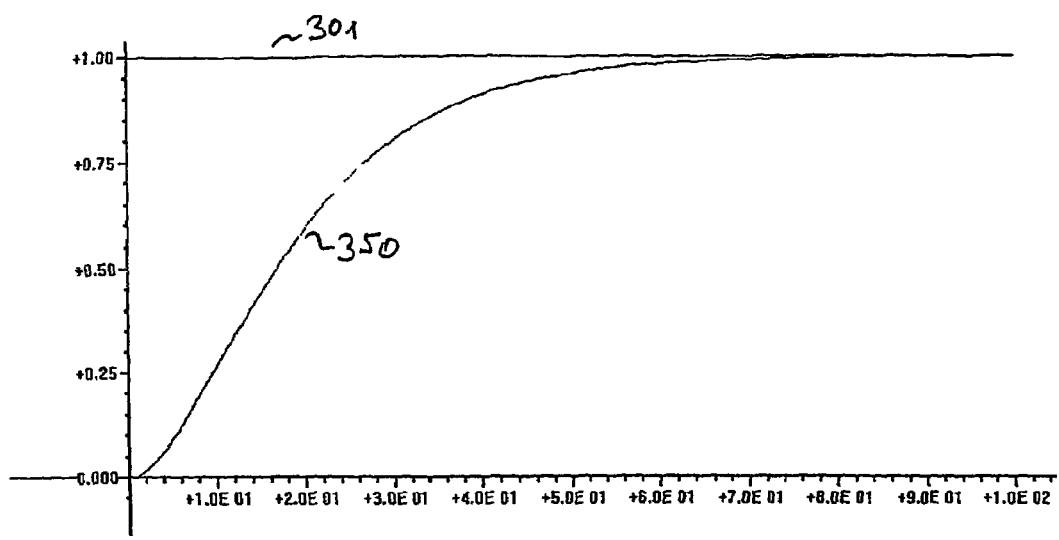
FIG. 3b shows the response function at the output 350 with a jump amplitude of 1.

FIG. 3b shows the response function at the output 350 with a jump amplitude 1. Since, according to FIG. 3a, an open loop circuit was taken to be a prerequisite, the response function according to FIG. 3b results exclusively from the precipitous variation in the pollutant concentration and therefore corresponds to the response function according to FIG. 1b.

Figure 4A:
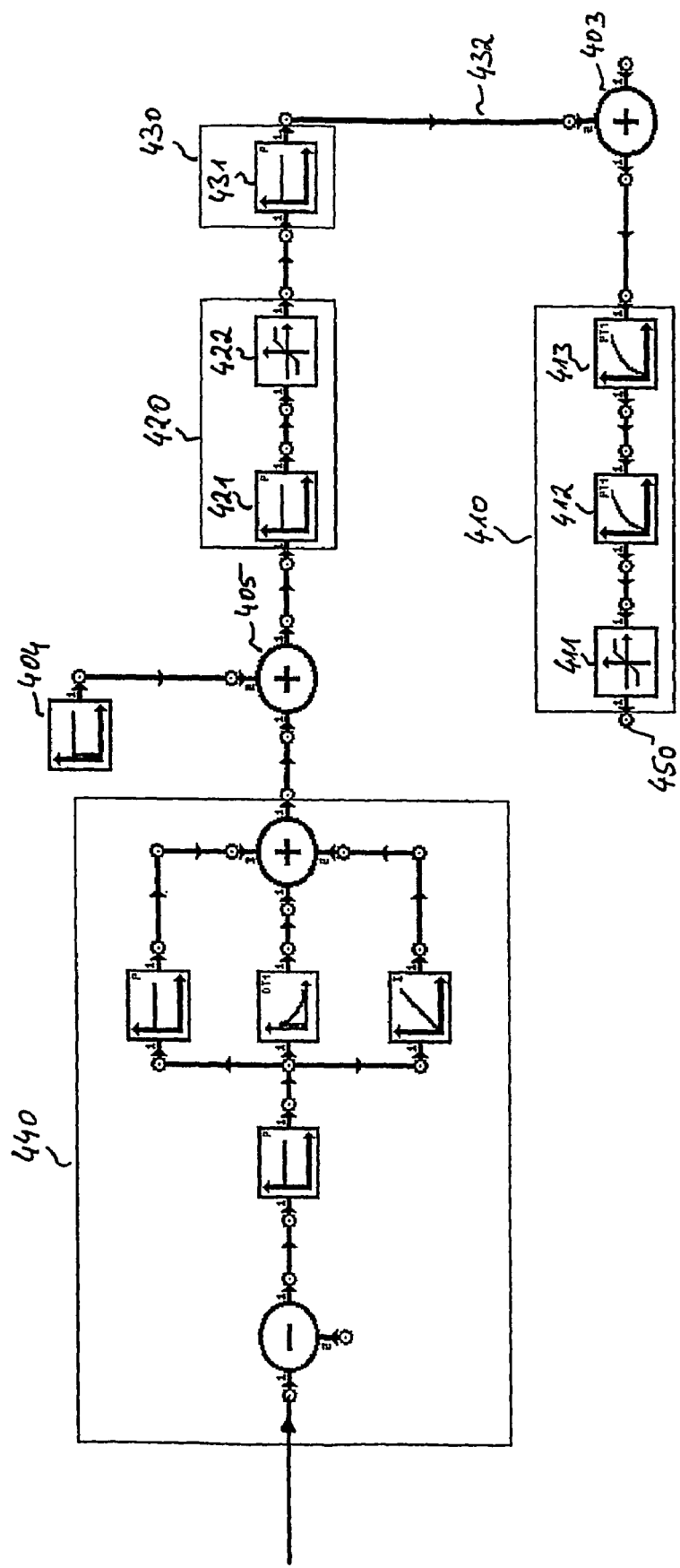
FIG. 4a shows a block diagram of the transfer response of an open loop control circuit with a jump function of the ionization power.

FIG. 4a shows a block diagram of the transfer response of an open loop control circuit with a jump function of the ionization power. As in FIG. 3a, the open loop control circuit comprises, once more, a controller 440, a driver stage 420, an ionizer 420 and a gas sensor 410. In this case, only the ionizer 430 has an effect on the summation point 403, without a further additional influence from the pollutant concentration, which is now kept constant in the air flow supplied to the ionizer.

In order to examine a jump function of the ionization power in the block diagram according to FIG. 4a, the summation point 405, on which the jump function 404 exerts an influence, was inserted between the controller 440 and the driver stage 420. The parameters of the blocks 411, 412, 413 of the gas sensor 410 are identical to the parameters of the gas sensor 110 according to FIG. 1a. The parameters of the blocks 421, 422 of the driver stage 420 are also identical to the parameters of the driver stage 220 according to FIG. 2a. The ionizer 430 was modeled by means of a simple P-element 431 having the following parameter:

P-element 431: transfer coefficient=−0.004

The output of the ionizer directly exerts an influence on the summation point 403, via the path 432, without any delay. It was therefore assumed, in this case, that the gas sensor 410 is arranged in immediate proximity to the ionizer 430. In the event of a greater distance between the ionizer 430 and gas sensor 410, a dead time element, for example, may be inserted on the path 432. The transfer response of the P-element of 431 therefore corresponds to a conversion of the variation in high voltage at the output of the driver stage 420 into a variation in the pollutant concentration to be measured by the gas sensor 410.

Figure 4B:
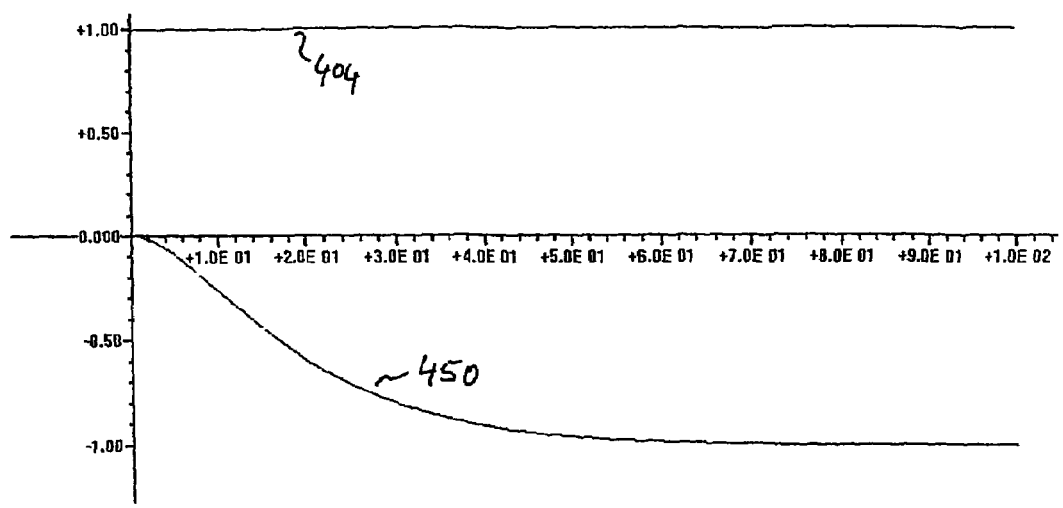
FIG. 4b shows the response function at the output 450 with a jump amplitude of 1.
Figure 4C:
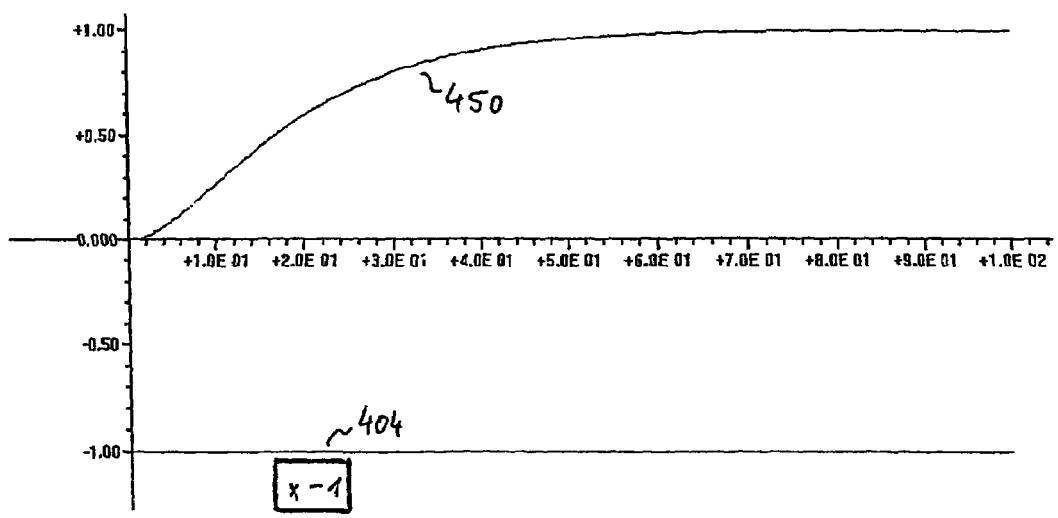
FIG. 4c shows the response function at the output 450 with a jump amplitude of −1.

FIG. 4b shows the response function at the output 450 with a jump amplitude of 1. An increase in the input voltage at the driver stage 420 by 1 volt therefore results in a decrease, also of 1 volt, of the output voltage of the gas sensor, the time function, in this case, resulting, once more, from the transfer response of the two PT1-elements 412, 413. The opposing response may be explained in that an increase in the ionization power is accompanied by a reduction of pollutants in the air flow. Accordingly, FIG. 4c shows the response function at the output 450 with a jump amplitude of −1. An opposing response may also be identified in this case, since a decrease in the ionization power results in an increase in the pollutant concentration in the air flow.

The measurements on the open loop control circuit according to FIG. 3a, FIG. 3b and FIG. 4a, FIG. 4b and FIG. 4c, respectively, indicate how the arrangement in accordance with the invention of the gas sensor with respect to the gas flow and with respect to the ionizer may easily be identified. FIG. 3b shows the output signal of the gas sensor, in the case of an open loop control circuit, on the basis of a variation in the pollutant concentration in the air flow. As a result of this variation, the output signal on the gas sensor rises from 0 V to 1 V.

In accordance with the invention, the gas sensor now has to be arranged with respect to the air flow and with respect to the ionizer such that, in an open loop control circuit, this variation may be compensated by a variation in the ionization energy such that the output signal of the gas sensor may be returned to its original value. FIG. 4b shows the output signal of the gas sensor in an open loop control circuit, in the event of a variation in the ionization energy and, at the same time, a constant pollutant concentration in the air flow supplied to the ionizer. In this case, the output signal of the gas sensor 450 changes from 0 V to −1 V if the voltage of 1 V is increased at the input of the driver stage. The arrangement of the gas sensor with respect to the air flow and with respect to the ionizer that is simulated in this case therefore corresponds precisely to the desired effect, such that the variation, illustrated in FIG. 3b, in the output signal of the gas sensor, on account of a corresponding variation in the ionization energy according to FIG. 4b, may be compensated. In practice, experiments corresponding to FIG. 3a and FIG. 4a may be carried out in order to verify said compensation effect on the open loop control circuit.

The response of the closed loop control circuit will now be explained in greater detail. For this purpose, FIG. 5a shows, in the first place, a block diagram of the main signal flow of the closed loop control circuit. The closed loop control circuit comprises the above-described control circuit elements, i.e. a gas sensor 510, a controller 540, a driver stage 520 and an ionizer 530. The driver stage 520, for its part, comprises a voltage source 525, a pulse width modulator 526, a resonator 527 and a high-voltage transformer 528.

A D.C. voltage supplied by the voltage source 525 is converted by the pulse width modulator 526 into pulses exhibiting a pulse width ratio determined by the controller 540 and a clock rate determined by a clock generator (not shown in greater detail). In the event of smoothing of these pulses, a D.C. voltage is produced that is proportional to the pulse width ratio and is supplied to a resonator 527. The resonator 527 is wired to the subsequent high-voltage transformer 528 such that, on the one hand, when a D.C. voltage is supplied, it automatically starts to oscillate at a working frequency in the range from approx. 25 kHz to 35 kHz and, on the other hand, it supplies a secondary-side oscillating high voltage, the peak value of which is approximately proportional to the input voltage of the resonator 527 or to the adjusted pulse width of the pulse width modulator 526. The oscillating high voltage, supplied by the high-frequency transformer 528, exhibiting peak values in the range from 1.0 kV to 2.0 kV, for example, is applied to the two electrodes of the ionizer 530.

The air 500 to be purified flows around the ionizer 530, the gas sensor 510 being arranged, on the flow side, downstream of the ionization tube 530. In the case of the closed loop control circuit, all or part of the air flow may be fed back using the circulation air mode. The gas sensor 510 supplies its output signal to the controller 540, which carries out a desired/actual value comparison on the basis of the desired value 547 and adjusts the pulse width ratio of the pulse width modulator 526 in accordance with the basic control algorithm.

Figure 5B:
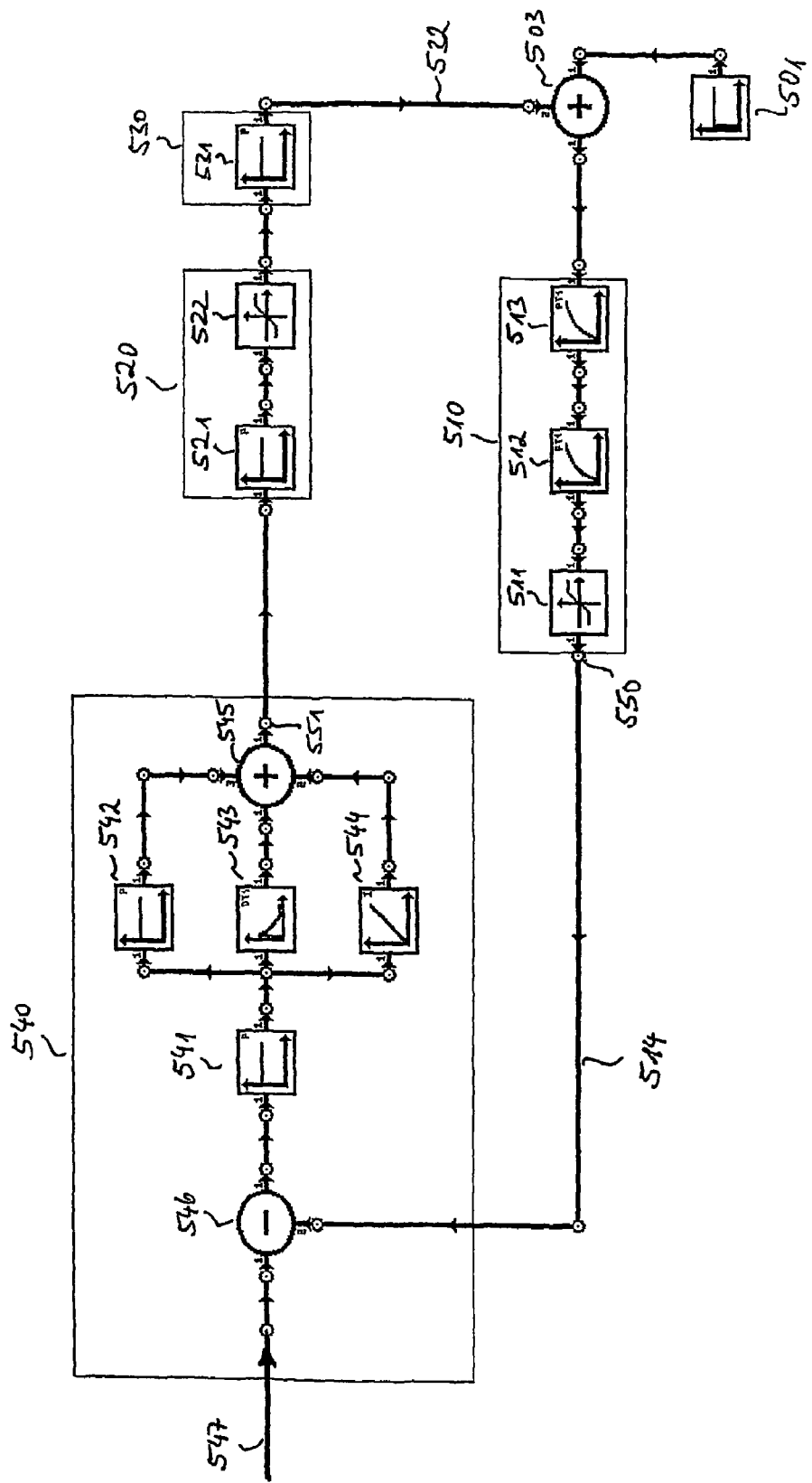
FIG. 5b shows a block diagram of the transfer response of a closed loop control circuit with a jump function of the pollutant concentration.

FIG. 5b shows a block diagram of the transfer response of a closed loop control circuit with a jump function of the pollutant concentration. The closed loop control circuit according to FIG. 5b is developed from the open loop control circuit according to FIG. 3a in that the output signal 550 of the gas sensor is fed back to the controller 540 via the branch 514. The blocks of the gas sensor 510, of the driver stage 520 and of the ionizer 530 with the associated parameters are identical to the indicated parameters of the gas sensor 310 according to FIG. 3a or the driver stage 420 and the ionizer 430 according to FIG. 4a, so that reference may be made, in this regard, to the description according to FIG. 3a and according to FIG. 4a.

The construction of the controller 540 will now be described in detail. The desired value 547 is guided in the controller to the subtraction point 546. The control deviation thus determined reaches the subsequent PID controller via the P-element 541. The PID-controller comprises, in turn, a P-element 542, a DT1-element 543 and an I-element 544, the outputs of which are integrated with the summation point 545 to form the output 551. The output 551 supplies the control variable, which is used as the input for the driver stage 520. The parameters of the controller 540 were defined as follows:

Desired value 547: desired value=0
P-element 541: transfer coefficient=−1
P-element 542: transfer coefficient=2
DT1-element 543: transfer coefficient=8, time constant=2 secs.
I-controller 544: transfer coefficient=0.21/second, corresponding to an integration constant of 5 secs.

The closed control loop response is now examined with reference to the jump function 501, which corresponds to a precipitous variation in the pollutant concentration in the air flow. In this case, the time signals are illustrated at the output of the gas sensor 550 and at the output of the controller 551.

Figure 5C:
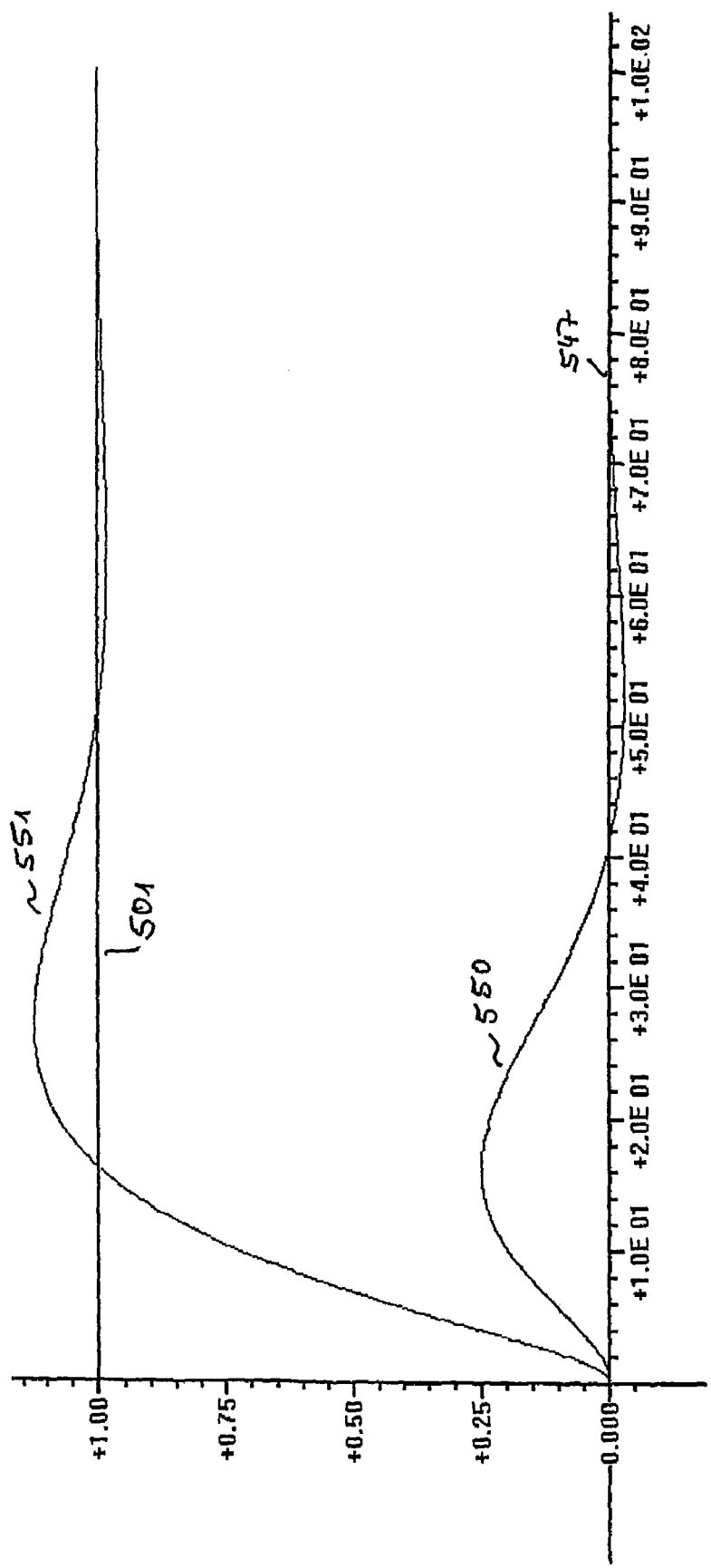
FIG. 5c shows the response functions at the outputs 550 and 551 with a jump amplitude of 1.

FIG. 5c shows the response functions at the outputs 550 and 551 with a jump amplitude of 1.

It is clear from the output signal of the gas sensor 550 that, despite a precipitous variation in the pollutant concentration, the control circuit is able to return the output signal 550 to the desired value 547. Once the output signal has been increased to approx. 0.25, after approx. 40 seconds, the output signal reaches its original value once again and then, within a further 40 seconds, approximates the desired value once more, with a small overshoot. The output variable 551 of the controller 540, on the other hand, ensures that the driver stage 520 is acted on by an adequate input variable, so that the variation in the pollutant concentration that has occurred may be compensated at the summation point 503. After approx. 25 seconds, the control variable 551 has reached its maximum value and from then on approximates the end value 1.0, which corresponds to an input voltage of 1.0 V at the input of the driver stage 520. It may be inferred from FIG. 5c that the transient response of the closed loop control circuit is substantially determined by the time response of the gas sensor 510, provided that no additional delays occur on the path 532 between the ionizer 530 and gas sensor 510. The time constant of the gas sensor may be determined using an arrangement as shown in FIG. 1a. The time constant of the recorded jump function 150 corresponds approximately to the time in which the jump function 150 reached the value (1−1/e), if it is assumed that the total transfer response of the gas sensor is approximated by means of an individual PT1-element.

If, on the other hand, the path 532 between the ionizer 530 and gas sensor 510 were to exhibit a delay (as a result of the flow rate of the air flow, for example, if the gas sensor is arranged at a distance from the ionizer), a secondary condition may be established for this delay time, in order not to slow down the transient response of the closed loop control circuit unnecessarily. It may accordingly be stipulated as a secondary condition that, in an open loop control circuit and at a constant pollutant concentration, the delay time of the output signal of the gas sensor is to be below the above-defined time constant of the gas sensor, in the event of a variation in the ionization energy. In the present case, the time constant of the gas sensor 510 may be determined from the time function according to FIG. 1b to be approx. 20 seconds. In order to optimize, with respect to time, the transient response of the closed loop control circuit, the gas sensor should thus fulfill the additional secondary condition, with respect to the air flow and with respect to the ionizer, such that the delay time of the path 532 is also below 20 seconds. Generally, this secondary condition is easy to fulfill, in that the gas sensor is arranged suitably close to the ionizer.

Figure 6A:
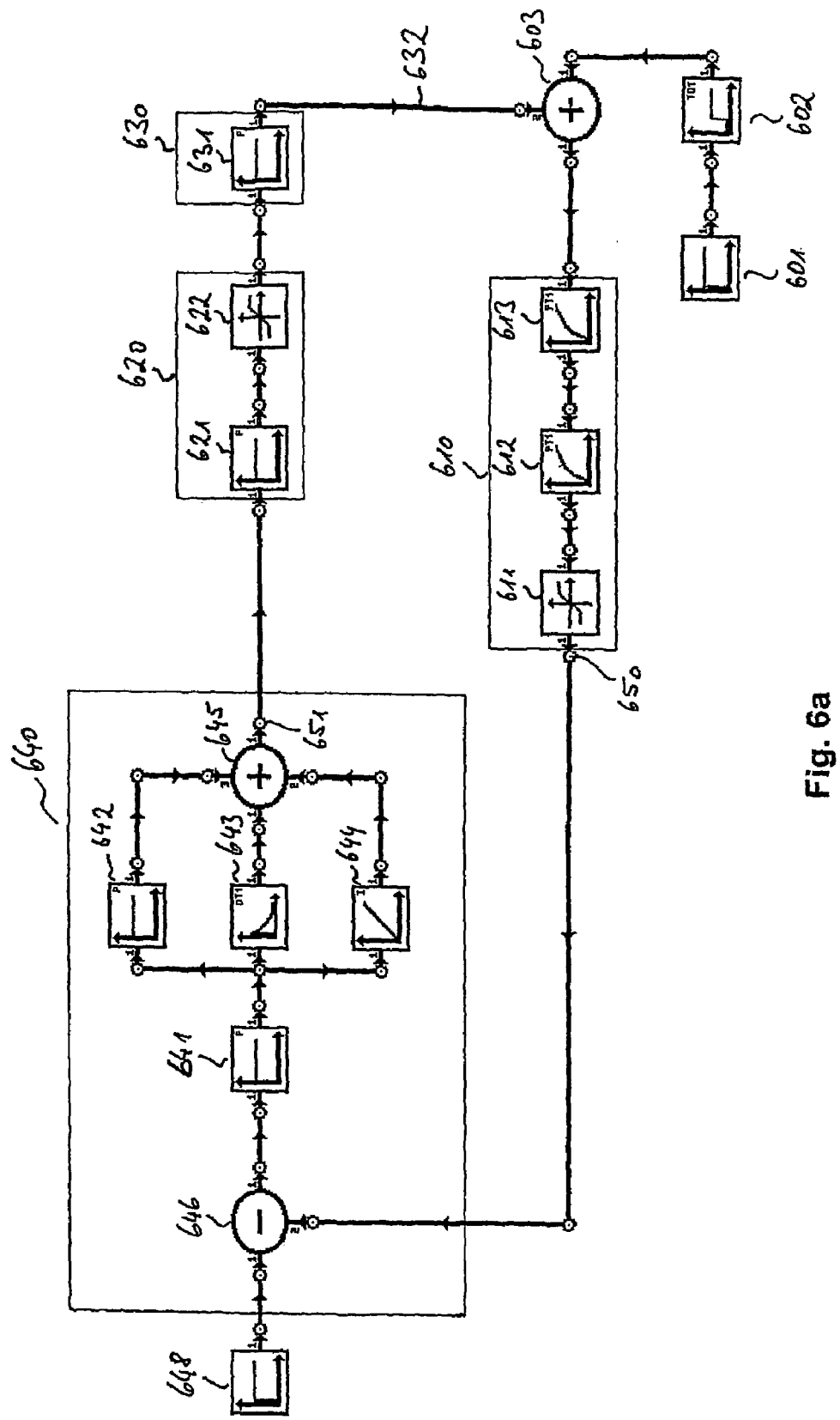
FIG. 6a shows a block diagram of the transfer response of a closed loop control circuit with a jump function of the desired value and a subsequent jump function of the pollutant concentration.

FIG. 6a shows a block diagram of the transfer response of a closed loop control circuit with a jump function of the desired value and a subsequent jump function of the pollutant concentration. The only difference between the block diagram according to FIG. 6a and the block diagram according to FIG. 5b is that a jump function 648 is now the desired value and the precipitous variation in the pollutant concentration 601 only takes place after a certain dead time 602. 100 secs. were taken as a parameter for the dead time. Otherwise, the block diagram according to FIG. 6a corresponds to the block diagram according to FIG. 5b, so that, as far as the remaining components are concerned, reference may be made to that part of the description.

Figure 6B:
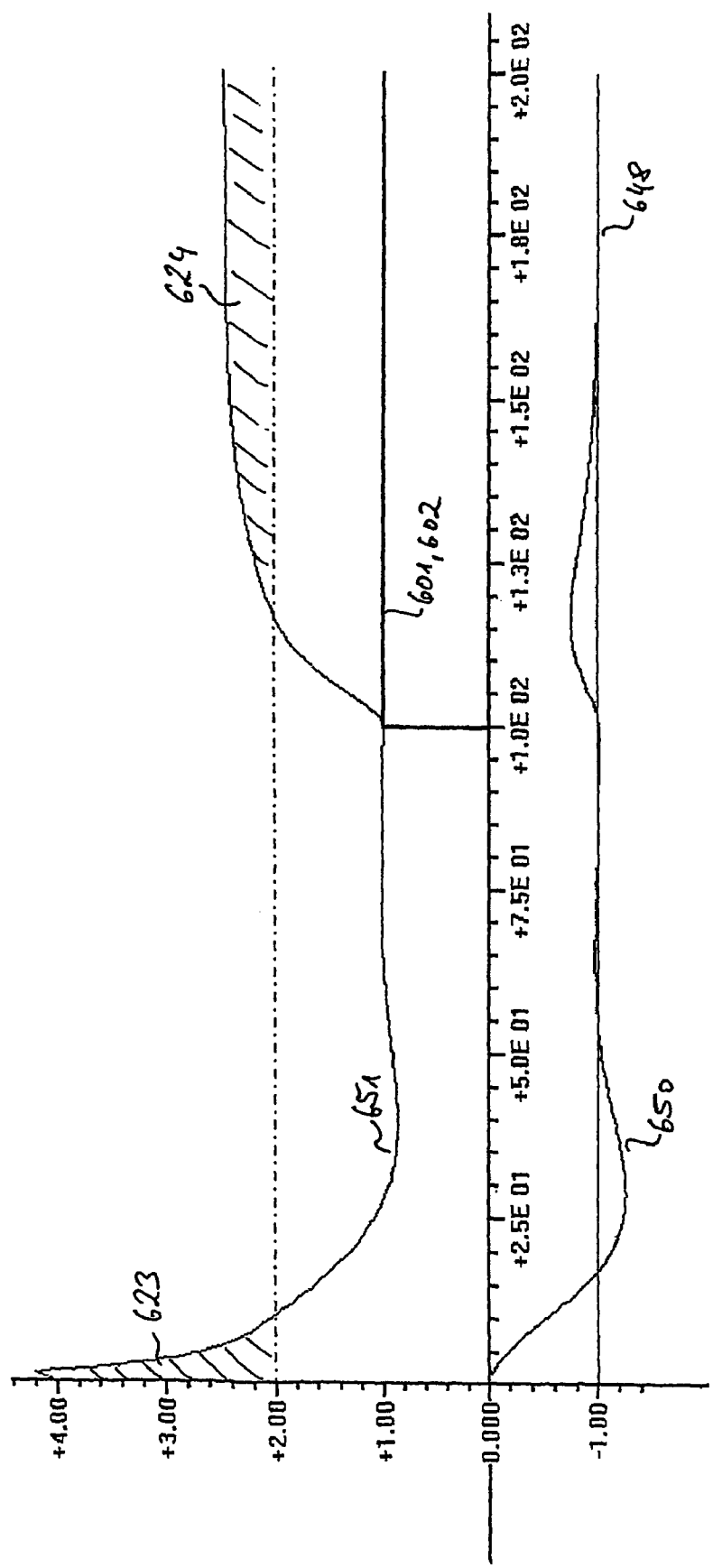
FIG. 6b shows the response functions at the outputs 650 and 651 with jump amplitudes, in each case, of 1.

The closed loop circuit according to FIG. 6a is therefore first of all acted on by a variation in the desired value 648 and is then, once the dead time 602 has expired, additionally acted on by a variation in the pollutant concentration 601. In FIG. 6b, the corresponding response functions are illustrated at the outputs 650 and 651. The dot-dash line at value 2 also indicates the limitation, which corresponds to the limitation of the driver stage 620, taking into account the transfer coefficient of the P element 21.

Owing to the differential content 643 of the controller 640, the precipitous increase in the desired value 648 initially results in a high control variable 651. After 60 seconds, the control circuit has then built up to the new desired value, so that there is now the output signal with the value −1.0 at the output 650 of the gas sensor. After 100 seconds, there is then an additional cut-in of the precipitous variation in the pollutant concentration, after which the control variable 651 rises once more, in order this time to maintain the output signal 650 of the gas sensor at the value −1. What is revealing, in this case, is the interpretation of the regions 623 and 624. As a result of the limitation 622 of the driver stage 620, the control variables above the value 2.0 or below the value −2.0 may not be transmitted to the ionizer 630. It is therefore expedient, as stated above, to provide additional measures in these regions, in order to supply a higher ionization power, by connecting an additional blower and/or by connecting further ionizers, for example.

Figure 7:
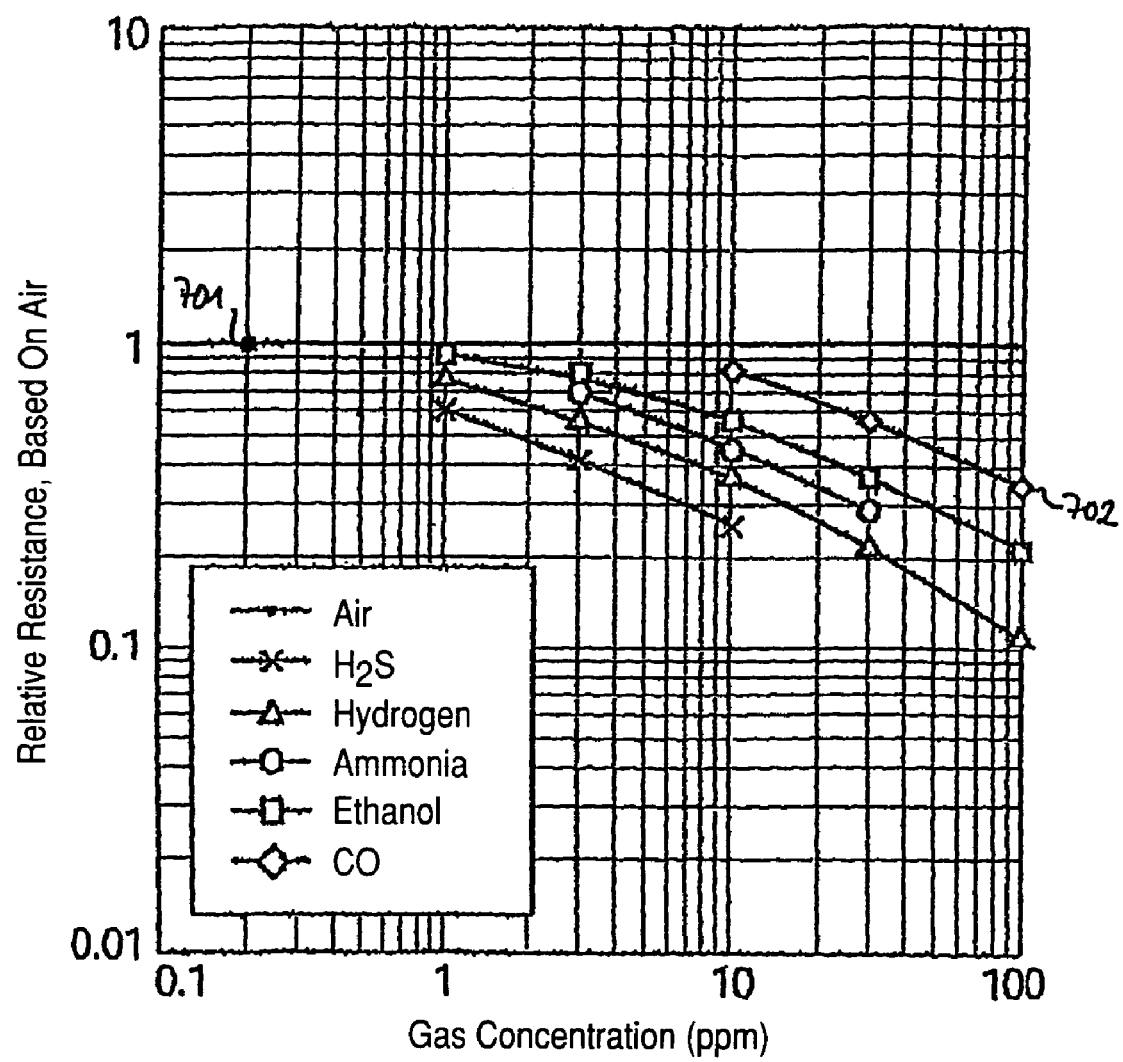
FIG. 7 shows the sensitivity characteristics of a tin oxide gas sensor.

FIG. 7 shows the sensitivity characteristics of a tin oxide gas sensor. The diagram plots the relative resistance variation, based on air, of the tin oxide element as a function of the pollutant concentration of various pollutants. As the line 701 shows, the tin oxide gas sensor is insensitive to air or oxygen. However, as the pollutant concentration increases, the sensor exhibits marked sensitivity to $H_2S$, hydrogen, ammonia, ethanol and CO. For the household sector, it has been found that stable control may, in particular, be attained if the control is adjusted to the sensitivity curve 702 of CO.

Figure 8:
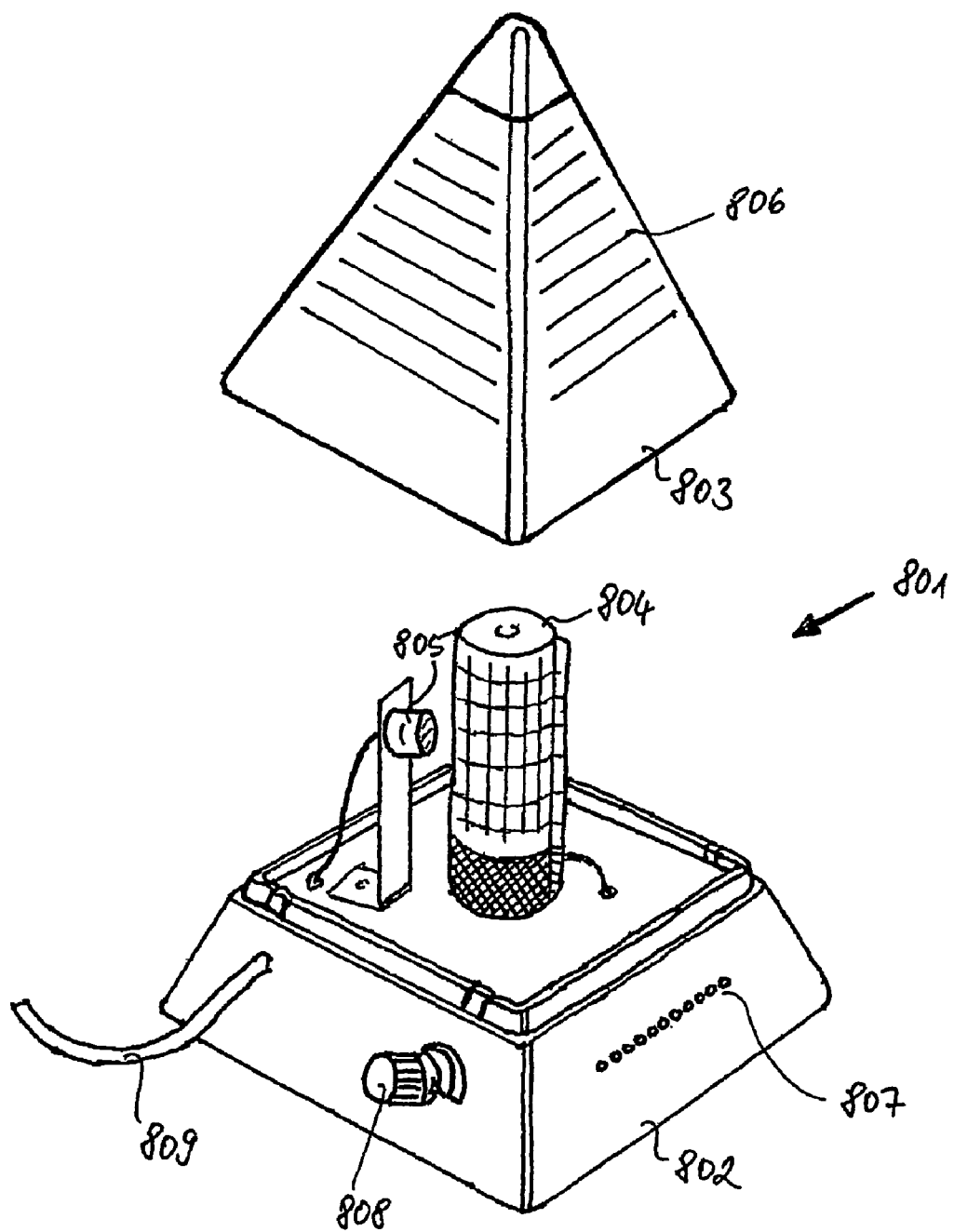
FIG. 8 shows a perspective illustration of an air purification device in accordance with the invention.

FIG. 8 shows a perspective illustration of an air purification device in accordance with the invention. The air purification device 801 is configured as a table device with a pedestal 802 and a cover 803. An ionization tube 804, which is constructed in the above-described manner, is fastened to the pedestal, as the ionizer. A gas sensor 805, which, in accordance with the invention, is arranged with respect to the ionizer 804 such that, in an open loop control circuit, a variation in the output signal of the gas sensor owing to a precipitous variation in the pollutant concentration in the air supplied by the air flow may be compensated by a variation in the ionization energy, is also fastened to the pedestal. The air flow enters and leaves the housing through the air slits 806 formed in the cover 803. A suitable ventilator may also be provided on the pedestal 802 or even outside the device in order to assist the air flow. An LED display 807 and an operating potentiometer 808, for operating the device, and an electrical supply line 809, for supplying power, are provided at the edge of the pedestal.

Figure 9:
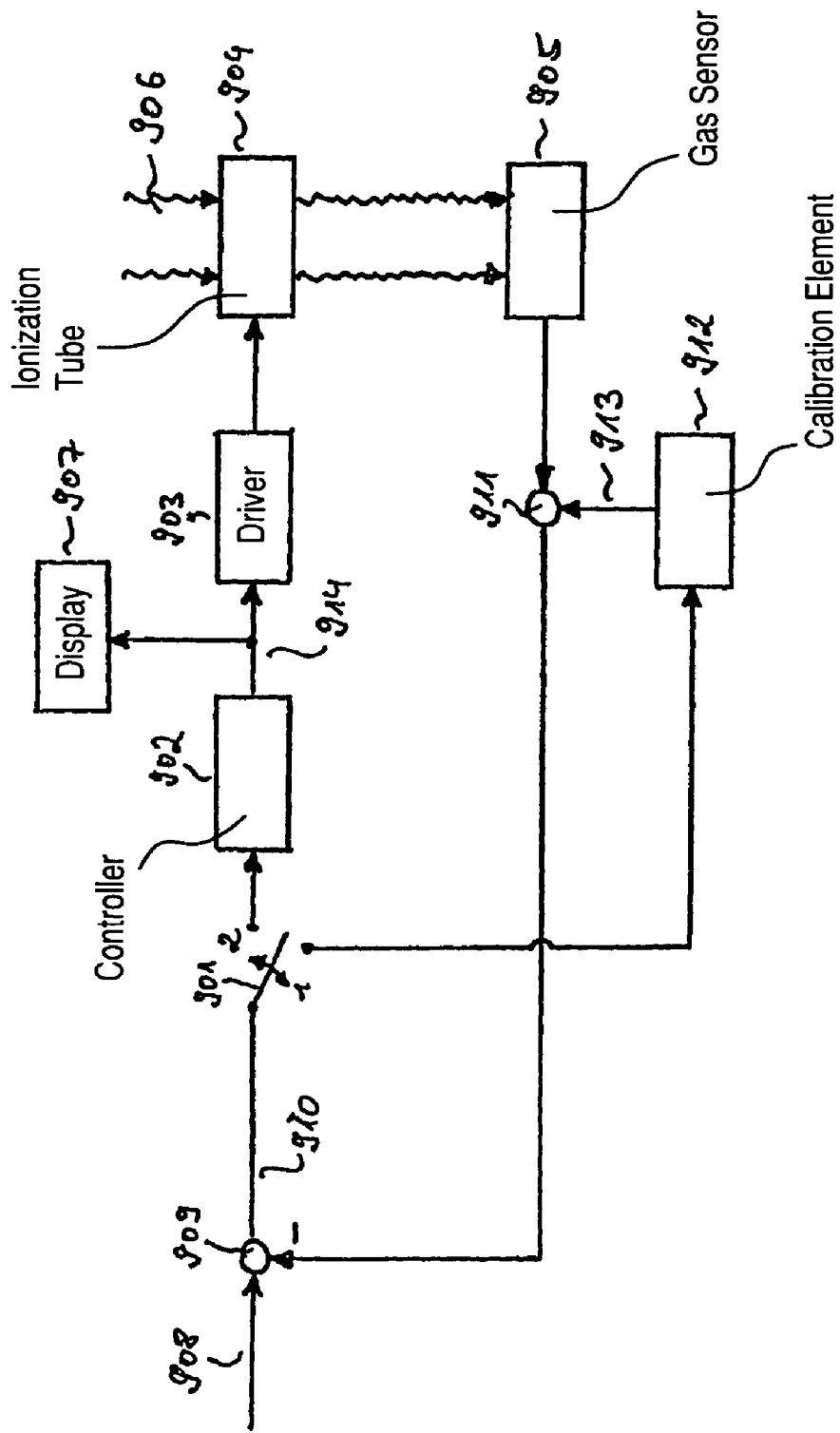
FIG. 9 shows a block diagram of the air purification device in accordance with the invention according to FIG. 8.

The function of the air purification device 801 will be explained with reference to FIG. 9, which shows a block diagram of the air purification device in accordance with the invention according to FIG. 8. The calibrating operation, in which the gas sensor is calibrated to a predetermined pollutant concentration, will be described first of all. This calibration is generally necessary because commercially available gas sensors exhibit various characteristic curves and would thus elicit different control circuit responses. However, with the use of tin oxide gas sensors, it has been noted that the relative variation in the output signal of the gas sensor, in the event of the gas concentration varying, is almost constant, and that only an absolute displacement of the output signal, at a given gas concentration, between various gas sensors may be observed. In the case of the control in accordance with the invention, the fact that the sensor is only operated in a small operating range anyway, so that the sensor characteristic curve may be linearised around this operating range once the operating point has been calibrated, may also be utilized.

For the calibrating operation, the change-over switch 901 is initially brought into the position 1, so that the ionization tube 904 is not acted on by ionization power. Instead, the control deviation is supplied to the calibration element 912. A constant pollutant concentration, which, depending on the respective application, corresponds to "clean air", and hence to the targeted desired value, is then introduced into the air flow 906. On the device, the operating potentiometer 808 is brought into the targeted desired value position, so that the desired value 908 thus adjusted is at the comparison point 909. If calibration has not yet taken place, a control deviation 910 will then be observed at the output of the comparison element. The adding element 911 and the calibration element 912 are now also provided for the purposes of calibration. The calibration element 912 receives the control deviation 910 as an input from the change-over switch 901, and then increases or decreases the output voltage 913 such that the control deviation 910 is set to zero. The voltage level 913 thus determined may, for example, be stored in a memory, so that it is still available after a power failure. This type of calibration may optionally be repeated a plurality of times, wherein varying pollutant concentrations 906 may also be taken into account.

Running operation, for which the change-over switch 901 is moved into the position 2, so that the controller 902 receives the control deviation 910 as the input variable, will now be described. The driver stage 903 supplies the ionization tube 904 with ionization power as a function of the output of the controller 902. The control algorithm of the controller 902 corresponds to an integration controller, the function of which is illustrated by the flow diagram according to FIG. 10. First of all, it should be assumed that the controller supplies a previously stored initialization variable, which corresponds to a low ionization power, at the output. As long as the pollutant concentration 906 corresponds to the previously adjusted desired value, the control deviation 910 remains unchanged at zero, so that the controller does not take any action. If the pollutant concentration 906 now increases, this increase in the pollutant concentration is detected by the gas sensor 905, which results in an enlargement of the control deviation 910. The controller 902 then increases the control variable 914 as a function of the control algorithm, so that the ionization tube 904 is acted on by a greater ionization power via the driver stage 903. This process continues, in accordance with the invention, until, as a result of the increased ionization power, the output signal of the gas sensor 905 is returned to its original value and the control deviation 910 is thus set to zero once more. The corresponding functioning ensues if, conversely, the pollutant concentration 906 is reduced once more.

The user may use the display 907 to monitor the control variable 914. Large control variables indicate a high ionization power, and hence air that is highly contaminated with pollutants, whereas low control variables correspond to the pollutant contaminations determined during the calibrating operation. In the air purification device according to FIG. 8, the display 907 is configured as an LED display 807. In this case, it is expedient to adjust the present value range of the control variable 914 to the display range of the LED display 807. This may be done in that, in a predetermined time window, the value range is detected between the smallest and the largest control variable and, between these, the values of the control variable are divided onto the LED display 807 in a linear or correspondingly scaled manner (i.e. logarithmically, for example).

Figure 10:
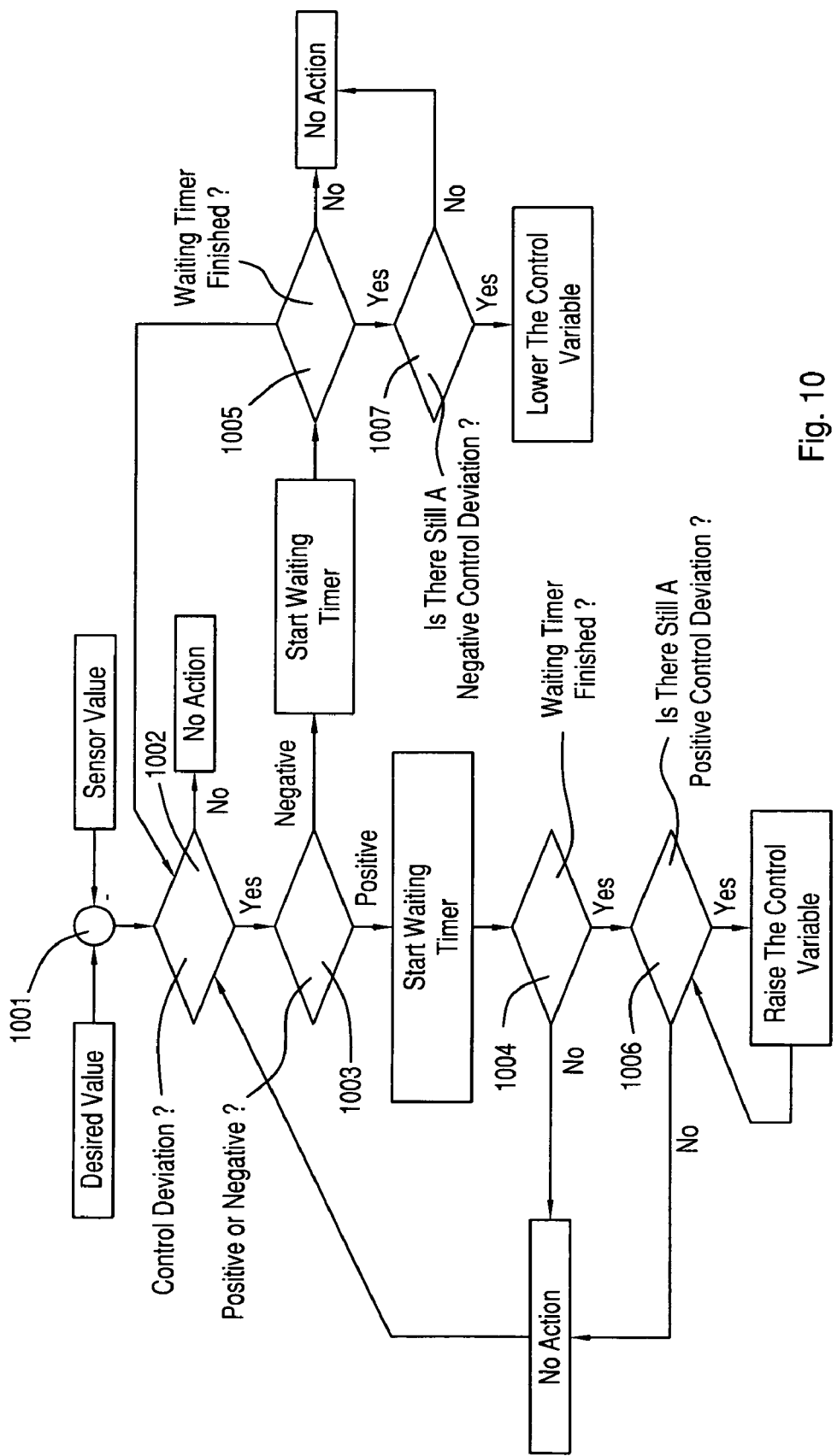
FIG. 10 shows a flow diagram of the control algorithm of the controller from FIG. 9.

The control algorithm will be explained in detail with reference to FIG. 10, which shows a flow diagram of the control algorithm of the controller from FIG. 9. In the step 1001, the desired value and the supplied measurement value of the gas sensor, which, as explained above, was optionally corrected by a calibration value, are first of all compared. In the steps 1002 and 1003, it is then initially checked whether there is a positive or a negative control deviation. If this is the case, in the step 1004 or 1005, a waiting timer, which is used to eliminate disturbance variables, is started. In the step 1006 or 1007, it is then checked whether there is still the control deviation. If this is the case, the control variable 914 is raised or lowered.

I claim:

1. Air purification device for reducing pollutants in the air, comprising:
    an ionizer, which is exposed to an air flow;
    a driver stage operably connected to the ionizer to provide ionization power for ionizing the air supplied by the air flow;
    a gas sensor for measuring pollutant concentration and indicating a measured pollutant concentration by an output signal;
    a controller operably connected to the driver stage and the gas sensor;
    the driver stage, the ionizer, the gas sensor and the controller form a closed loop control circuit such that in case of a variation in the pollutant concentration in the air supplied by the air flow the output signal of the gas sensor may be returned to a predetermined desired value; and
    the gas sensor being arranged a predetermined distance with respect to the ionizer to maintain a sufficient feedback between the ionizer and the gas sensor, the predetermined distance is such that, in an open loop control circuit, a variation in the output signal of the gas sensor owing to a precipitous variation in the pollutant concentration in the air supplied by the air flow may be compensated by a variation in the ionization power such that the output signal of the gas sensor may be returned to its predetermined desired value.

2. Air purification device according to claim 1, wherein the driver stage comprises a high-voltage transformer, on the secondary side of which an oscillating high voltage may be generated.

3. Air purification device according to claim 2, wherein the driver stage comprises a circuit for pulse width modulation for adjusting the ionization power which is supplied by the oscillating high voltage to the ionizer.

4. Air purification device according to claim 3, wherein the secondary-side oscillating high voltage may be adjusted with a peak value in the range from 1 kV to 10 kV and with a frequency in the range from 10 kHz to 50 kHz.

5. Air purification device according to claim 2, wherein the ionizer comprises a glass tube, the inner wall of which is lined with a perforated metal sheet as a first electrode and the outer wall of which is surrounded by a wire mesh as a second electrode, the oscillating high voltage of the driver stage being applied between the first electrode and the second electrode.

6. Air purification device according to claim 1, wherein the gas sensor comprises a metal oxide sensor, the resistance of which varies as a function of the concentration of specific gases.

7. Air purification device according to claim 6, wherein the metal oxide comprises tin oxide.

8. Air purification device according to claim 1, wherein the gas sensor is at the predetermined distance of approx. 0.5 cm to 2 cm with respect to the ionizer.

9. Air purification device according to claim 1, wherein the predetermined desired value may be manually adjusted on the device.

10. Air purification device according to claim 1, wherein a ventilator is provided for generating the air flow.

11. Air purification device according to claim 10, wherein an additional controller additionally controls the rotational speed of the ventilator such that the output signal of the gas sensor may be returned to the predetermined desired value.

12. Air purification device according to claim 11, wherein the additional controller is connected as soon as a limitation occurs in the control circuit comprising the ionizer, driver stage, gas sensor and controller.

13. Air purification device according to claim 1, wherein the controller comprises a proportional-controller (P-controller), a proportional-integral-controller (PI-controller) or a proportional-integral-derivative-controller (PID-controller).

14. Air purification device according to claim 1, wherein, in addition to the measured pollutant concentration, further measurement variables are processed by the controller.

15. Air purification device according to claim 14, wherein at least one of a flow sensor, a moisture sensor, an ionization sensor and an ozone sensor are connected to the controller for processing further measurement variables.

16. Air purification device according to claim 14, wherein the controller comprises a rule-based fuzzy controller.

17. Air purification device according to claim 14, wherein the controller comprises a state controller.

18. Air purification device according to claim 1, wherein a calibration element calibrates the gas sensor to the predetermined desired value if a pollutant concentration corresponding to the predetermined desired value is supplied to the gas sensor.

19. Air purification device according to claim 18, wherein the ionization power supplied to the ionizer is disconnected during a calibration of the gas sensor.

20. Method for reducing pollutants in the air, comprising:
    providing an air purification device according to claim 1;
    adjusting the predetermined desired value to a specific pollutant concentration; and
    supplying air containing pollutants to the ionizer and wherein air with a reduced pollutant content is drawn off.

* * * * *